US010181623B2

(12) United States Patent
Eom et al.

(10) Patent No.: US 10,181,623 B2
(45) Date of Patent: Jan. 15, 2019

(54) BATTERY MODULE INCLUDING SENSING ASSEMBLY AND BATTERY PACK COMPRISING THE SAME

(71) Applicant: LG CHEM, LTD., Seoul (KR)

(72) Inventors: Young-Sop Eom, Daejeon (KR); Jun-Yeob Seong, Daejeon (KR); Ki-Youn Kim, Daejeon (KR); Sung-Chun Yu, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 307 days.

(21) Appl. No.: 15/030,640

(22) PCT Filed: Nov. 26, 2014

(86) PCT No.: PCT/KR2014/011425
§ 371 (c)(1),
(2) Date: Apr. 20, 2016

(87) PCT Pub. No.: WO2015/080466
PCT Pub. Date: Jun. 4, 2015

(65) Prior Publication Data
US 2016/0268652 A1 Sep. 15, 2016

(30) Foreign Application Priority Data
Nov. 29, 2013 (KR) .................. 10-2013-0147713

(51) Int. Cl.
*B60K 1/04* (2006.01)
*B60L 3/12* (2006.01)
(Continued)

(52) U.S. Cl.
CPC ............. *H01M 10/484* (2013.01); *B60K 1/04* (2013.01); *B60L 3/12* (2013.01); *B60L 11/1805* (2013.01);
(Continued)

(58) Field of Classification Search
CPC .... H01M 2/1077; H01M 2/26; H01M 10/482; H01M 10/4285; H01M 10/484;
(Continued)

(56) References Cited

U.S. PATENT DOCUMENTS

| 2007/0207377 | A1 | 9/2007 | Han et al. |
| 2009/0323293 | A1 | 12/2009 | Koetting et al. |
| 2009/0325042 | A1 | 12/2009 | Koetting et al. |
| 2010/0227212 | A1* | 9/2010 | Kim .................. H01M 2/0404 429/158 |

(Continued)

FOREIGN PATENT DOCUMENTS

| EP | 2 908 360 A1 | 8/2015 |
| JP | 2012-138268 A | 7/2012 |

(Continued)

OTHER PUBLICATIONS

International Search Report, issued in PCT/KR2014/011425, dated Feb. 26, 2015.

*Primary Examiner* — Sean P Cullen
(74) *Attorney, Agent, or Firm* — Birch, Stewart, Kolasch & Birch, LLP

(57) ABSTRACT

Disclosed is a battery module having a new voltage detection structure with respect to a plurality of secondary batteries included in a cell assembly. The battery module includes a cell assembly in which a plurality of secondary batteries, each having a plate-shaped electrode lead protruding in a horizontally laid state, are stacked in a vertical direction; and a sensing assembly for sensing voltages of the secondary batteries, the sensing assembly including a plurality of sensing plates made of an electrical conductive material with a horizontally laid plate shape and having one end welded in face-to-face contact with the electrode lead, and a connector electrically connected to the other end of the sensing plates to transmit a sensed voltage.

15 Claims, 9 Drawing Sheets

(51) Int. Cl.
*H01M 2/10* (2006.01)
*H01M 2/20* (2006.01)
*H01M 2/26* (2006.01)
*B60L 11/18* (2006.01)
*H01M 10/42* (2006.01)
*H01M 10/48* (2006.01)

(52) U.S. Cl.
CPC ....... *B60L 11/1866* (2013.01); *B60L 11/1879* (2013.01); *H01M 2/1077* (2013.01); *H01M 2/26* (2013.01); *H01M 10/4285* (2013.01); *H01M 10/482* (2013.01); *B60L 2240/547* (2013.01); *B60L 2240/549* (2013.01); *B60L 2270/145* (2013.01); *H01M 2/206* (2013.01); *H01M 2220/20* (2013.01); *Y02T 10/7016* (2013.01); *Y02T 10/7061* (2013.01)

(58) Field of Classification Search
CPC .... B60L 3/12; B60L 11/1805; B60L 11/1866; B60L 11/1879
USPC .................................. 429/156, 158, 159, 161
See application file for complete search history.

(56) References Cited

U.S. PATENT DOCUMENTS

| | | | |
|---|---|---|---|
| 2010/0281681 A1* | 11/2010 | Rourke | H01M 2/206 29/623.1 |
| 2011/0076531 A1 | 3/2011 | Lee et al. | |
| 2011/0097620 A1* | 4/2011 | Kim | H01M 2/1061 429/161 |
| 2012/0115023 A1 | 5/2012 | Cho et al. | |
| 2013/0143086 A1 | 6/2013 | Lee et al. | |
| 2014/0050954 A1 | 2/2014 | Kim et al. | |
| 2015/0194708 A1* | 7/2015 | Kim | B23K 26/20 429/90 |

FOREIGN PATENT DOCUMENTS

| | | | | |
|---|---|---|---|---|
| JP | 2013-541159 A | 11/2013 | | |
| KR | 10-2010-0003146 A | 1/2010 | | |
| KR | 10-2010-0120089 A | 11/2010 | | |
| KR | 10-2012-0016354 A | 2/2012 | | |
| KR | 10-2012-0121680 A | 11/2012 | | |
| WO | WO-2013191478 A1 * | 12/2013 | ............. | B23K 26/20 |

* cited by examiner

BATTERY MODULE INCLUDING SENSING ASSEMBLY AND BATTERY PACK COMPRISING THE SAME

TECHNICAL FIELD

The present application claims priority to Korean Patent Application No. 10-2013-0147713 filed on Nov. 29, 2013 in the Republic of Korea, the disclosures of which are incorporated herein by reference.

The present disclosure relates to a battery module, and more particularly, to a battery module having a new voltage detection structure with respect to a plurality of secondary batteries included in a cell assembly, its manufacturing method, and a battery pack comprising such a battery module.

BACKGROUND ART

Recently, the demand for portable electronic products such as notebooks, video cameras, cellular phones or the like has rapidly increased, and electric vehicles, energy storage batteries, robots, satellites have been actively developed. For this reason, high-performance secondary batteries allowing repeated charging and discharging are being actively studied.

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the exterior.

Recently, secondary batteries are widely used not only for small-sized devices such as cellular phones but also middle-sized or large-sized devices such as vehicles and power storages. In particular, along with the exhaustion of carbon energy and the increased interest on environments, hybrid electric vehicles and electric vehicles attract attention globally, for example in US, Europe, Japan and Korea. In such a hybrid electric vehicle or electric vehicle, a battery pack for giving a driving force to a vehicle motor is the most essential part. Since a hybrid electric vehicle or electric vehicle may obtain a driving force by means of charging and discharging of the battery pack, the hybrid electric vehicle or electric vehicle ensures excellent fuel efficiency and exhausts no or reduced pollutants, and for this reason, hybrid electric vehicles and electric vehicles are used more and more. In addition, the battery pack of the hybrid electric vehicle or electric vehicle includes a plurality of secondary batteries, and the plurality of secondary batteries are connected to each other in series or in parallel to improve capacity and output.

Meanwhile, the battery pack includes various battery pack protection devices such as a Battery Management System (BMS) in addition to the secondary batteries. These protection devices may play various roles of managing charge and discharge of the battery pack, ensuring safety, or the like. These protection devices may function in consideration of several factors, among which a representative factor may be a voltage of each secondary battery. For example, a specific protection device may prevent overcharge or overdischarge of a secondary battery by using voltage values at both ends of the corresponding secondary battery, and may also perform a balancing function to reduce a deviation of the state of charge among secondary batteries.

As described above, when a protection device included in the battery pack performs a specific function, it may be very important and essential to sense a voltage of each secondary battery included in the battery pack. For this reason, an existing battery pack mostly employs a configuration for detecting a voltage of a secondary battery.

However, the configuration for detecting a voltage of each secondary battery, employed in an existing battery pack, has a very complicated structure and is not easily assembled. In addition, due to such structural complexity and uneasy assembling, it is very difficult to sense a voltage of a unidirectional cell whose positive electrode lead and negative electrode lead are exposed at the same side. Moreover, the existing sensing structure is vulnerable to vibrations, and thus if the battery pack is applied to a device with a lot of vibrations, for example a vehicle, troubles may occur frequently.

DISCLOSURE

Technical Problem

The present disclosure is designed to solve the problems of the related art, and therefore the present disclosure is directed to providing a battery module, which employs a voltage sensing configuration having an uncomplicated structure and ensuring a simplified assembling process, a battery pack comprising the same, and a vehicle comprising the same.

Other objects and advantages of the present disclosure will be understood from the following descriptions and become apparent by the embodiments of the present disclosure. In addition, it is understood that the objects and advantages of the present disclosure may be implemented by components defined in the appended claims or their combinations.

Technical Solution

In one aspect of the present disclosure, there is provided a battery module, comprising: a cell assembly in which a plurality of secondary batteries, each having a plate-shaped electrode lead protruding in a horizontally laid state, are stacked in a vertical direction; and a sensing assembly for sensing voltages of the secondary batteries, the sensing assembly including a plurality of sensing plates made of an electrical conductive material with a horizontally laid plate shape and having one end welded in face-to-face contact with the electrode lead, and a connector electrically connected to the other end of the sensing plates to transmit a sensed voltage.

Preferably, the sensing plate may be welded to the electrode lead by means of ultrasonic welding.

Also preferably, the sensing plate may be welded to two electrode leads.

Also preferably, the sensing plate may be welded in contact with a portion of the surfaces of the two electrode leads.

Also preferably, the connector may be connected to the other end of the sensing plate by means of a wire.

Also preferably, the sensing assembly may further include a connection member provided between the sensing plate and the wire and having a plurality of plate coupling units to which the other end of the sensing plate is coupled and fixed and a plurality of wire connectors to which one end of the wire is connected, which are arranged in a vertical direction.

Also preferably, both ends of the plate coupling unit may be bent by at least 180 degrees, and the other end of the sensing plate may be inserted into the bent portion and fixed thereto.

Also preferably, some of the plurality of sensing plates may be provided to protrude in a left direction on the basis of the connection member, and the other sensing plates may be provided to protrude in a right direction on the basis of the connection member.

Also preferably, a coupling hole may be formed at the other end of the sensing plate, and a protrusion may be formed at the plate coupling unit of the connection member so as to be inserted into the coupling hole and coupled thereto.

Also preferably, the sensing assembly may further include a support plate with a vertically erect plate shape having a through hole through which the electrode lead is provided and by which the electrode lead is supported.

Also preferably, the sensing plate may have a bent portion formed by bending a portion thereof vertically, and the bent portion may be coupled and fixed to the support plate.

Also preferably, an engagement hole may be formed in the bent portion of the sensing plate, and a protrusion may be formed at the support plate to be inserted into the engagement hole and coupled thereto.

Also preferably, the sensing assembly may further include an electrode terminal formed to protrude outwards, and a bus bar for electrically connecting the electrode terminal to a sensing plate provided at an uppermost or lowermost portion.

Also preferably, the battery module may further include a sensing cover configured to cover the sensing assembly at a side opposite to the cell assembly.

In another aspect of the present disclosure, there is also provided a battery pack, which comprises the battery module according to the present disclosure.

In another aspect of the present disclosure, there is also provided a vehicle, which comprises the battery module according to the present disclosure.

In another aspect of the present disclosure, there is also provided a sensing assembly, which is connected to a cell assembly in which a plurality of secondary batteries, each having a plate-shaped electrode lead protruding in a horizontally laid state, are stacked in a vertical direction, for sensing voltages of the secondary batteries, the sensing assembly comprising: a plurality of sensing plates made of an electrical conductive material with a horizontally laid plate shape and having one end welded in face-to-face contact with the electrode lead; and a connector electrically connected to the other end of the sensing plates to transmit the sensed voltages of the secondary batteries.

In another aspect of the present disclosure, there is also provided a method for manufacturing a battery module, which includes a cell assembly in which a plurality of secondary batteries, each having a plate-shaped electrode lead protruding in a horizontally laid state, are stacked in a vertical direction, and a sensing assembly having a sensing plate and a connector, the method comprising: overlapping two electrode leads among the electrode leads and allowing the overlapped two electrode leads to come into surface contact with the sensing plate; and performing ultrasonic welding to the two overlapped electrode leads and the sensing plate.

Advantageous Effects

According to the present disclosure, a new sensing configuration for detecting a voltage of each of a plurality of secondary batteries included in a battery module is provided.

In particular, in an embodiment of the present disclosure, the configuration for detecting a voltage of each secondary battery may be not complicated but simple, and the assembling process for the connection to the secondary battery may be performed more easily.

In particular, due to such structural simplicity and easy assembling, the present disclosure may be easily applied not only to a bi-directional secondary battery at which electrode leads of a pouch-type secondary battery protrude in different directions but also to a unidirectional secondary battery at which electrode leads protrude in the same direction.

Further, in an embodiment of the present disclosure, a sensing assembly which may be easily welded to an electrode lead by means of ultrasonic welding is provided. In particular, in a sensing assembly according to an embodiment of the present disclosure, welding between an electrode lead and an electrode lead and welding between an electrode lead and a sensing assembly may be performed simultaneously. Therefore, the number of welding processes may be reduced, and thus the sensing assembly may be assembled to a cell assembly more simply.

In addition, in an embodiment of the present disclosure, a connector may be provided at the sensing assembly, and thus a separate connector assembling structure is not needed at the cell assembly.

Moreover, in an embodiment of the present disclosure, since the sensing assembly includes an electrode terminal, it is not needed to provide a separate electrode terminal at the cell assembly, and it is also not needed to provide a separate bus bar for connecting such an electrode terminal to the cell assembly.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
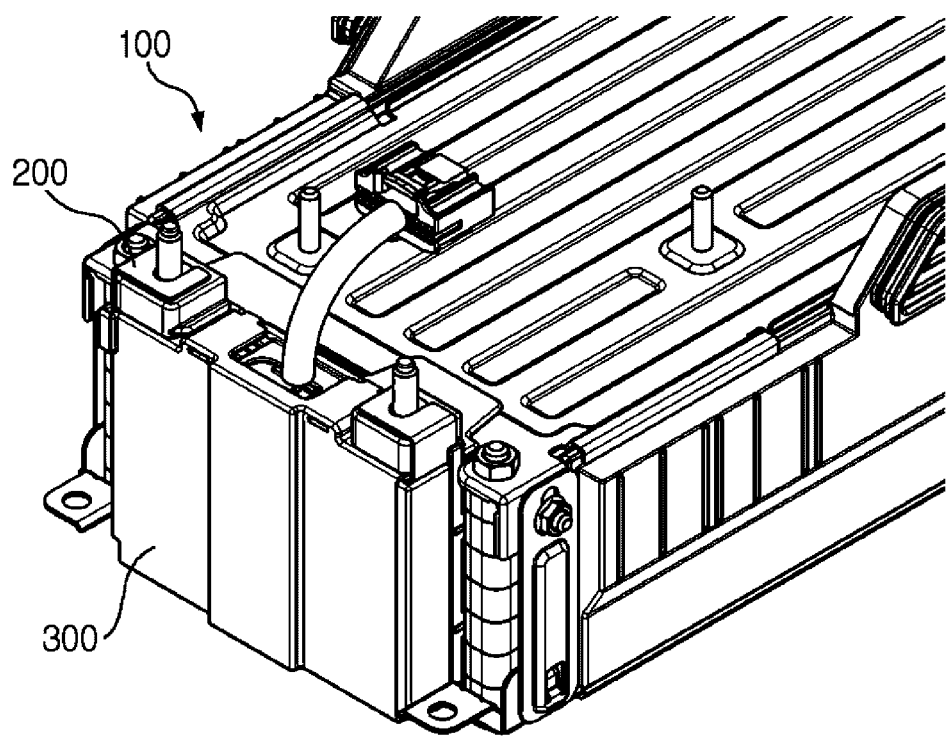
FIG. 1 is an assembled perspective view schematically showing a battery module according to an embodiment of the present disclosure.
Figure 2:
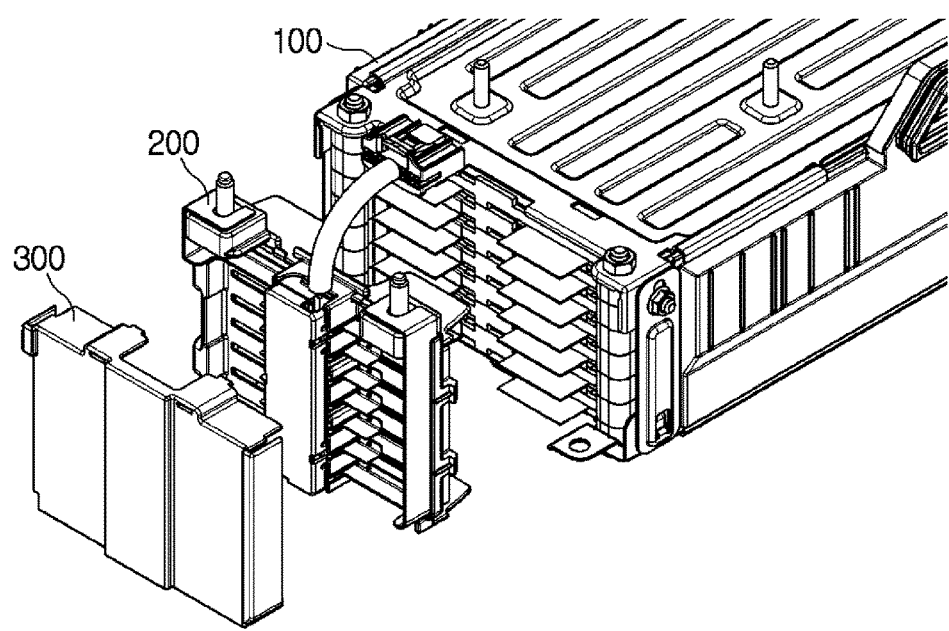
FIG. 2 is an exploded perspective view of FIG. 1.

FIG. 1 is an assembled perspective view schematically showing a battery module according to an embodiment of the present disclosure, and FIG. 2 is an exploded perspective view of FIG. 1. However, in FIGS. 1 and 2, only a front portion of the battery module at which a sensing assembly 200 is coupled to a cell assembly 100 is depicted, for convenience.

Referring to FIGS. 1 and 2, a battery module according to the present disclosure includes a cell assembly 100 and a sensing assembly 200.

The cell assembly 100 is an assembly of secondary batteries, which includes a plurality of secondary batteries. In the cell assembly 100, a plurality of pouch-type secondary batteries may be included as the secondary batteries, and the plurality of pouch-type secondary batteries may be stacked in one direction, for example in a vertical direction as shown in the figures.

Each pouch-type secondary battery may include an electrode lead, and the electrode lead may include a positive electrode lead and a negative electrode lead. Here, each electrode lead may be configured with a plate shape as shown in the figures, so as to protrude out of a pouch exterior in a horizontally laid state.

Meanwhile, the cell assembly 100 may include a stacking frame for stacking a plurality of pouch-type secondary batteries. The stacking frame is a component used for stacking secondary batteries, and the stacking frame may hold secondary batteries to prevent shaking of the secondary batteries, and many stacking frames may be stacked with each other to guide assembling of secondary batteries. The stacking frame may also be called with various terms, for example a cartridge, and may have a rectangular ring shape with a hollow center. In this case, four edges of the stacking frame may be located at the outer circumference of a secondary battery.

In addition, the cell assembly 100 may include end plates at upper and lower portions thereof, respectively. The end plates may have a plate shape with a large area to cover the upper and lower portions of the cell assembly 100. The end plates may give mechanical rigidity of the cell assembly 100 and play a role of protecting the cell assembly 100 against external impacts or the like. For this, the end plates may be made of metal material such as steel.

The sensing assembly 200 may be connected to the cell assembly 100 to sense a voltage of a secondary battery provided in the cell assembly 100. In particular, the sensing assembly 200 may be configured to sense voltages at both ends of every secondary battery provided in the cell assembly 100.

In particular, the sensing assembly 200 according to the present disclosure may include a sensing plate and a connector. The configurations of the sensing plate and the connector will be described in more detail with reference to FIGS. 3 to 6.

Figure 3:
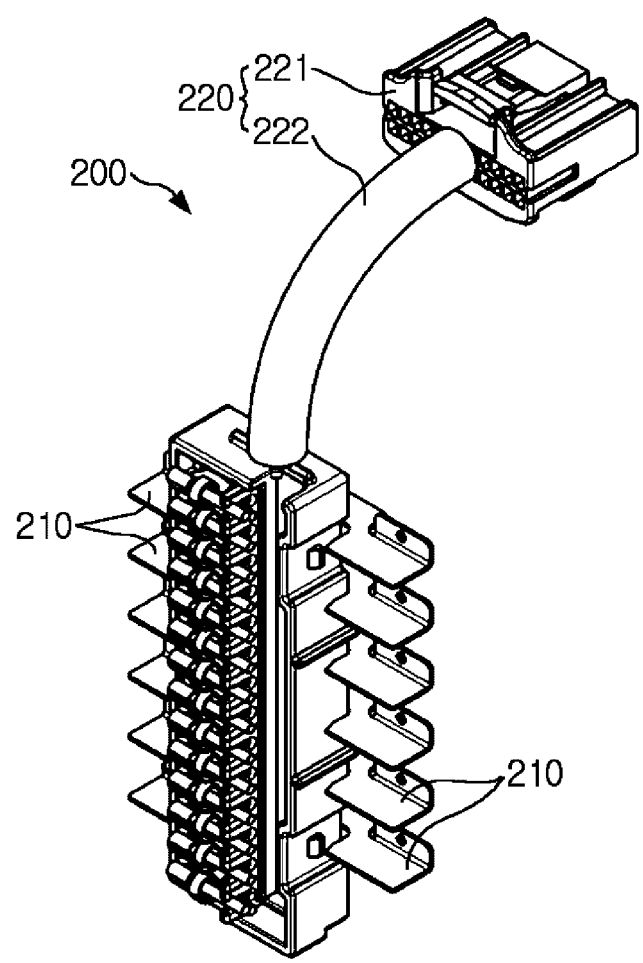
FIG. 3 is a schematic diagram separately showing a sensing plate and a connector, employed at a sensing assembly, in the configuration of FIG. 2.
Figure 4:
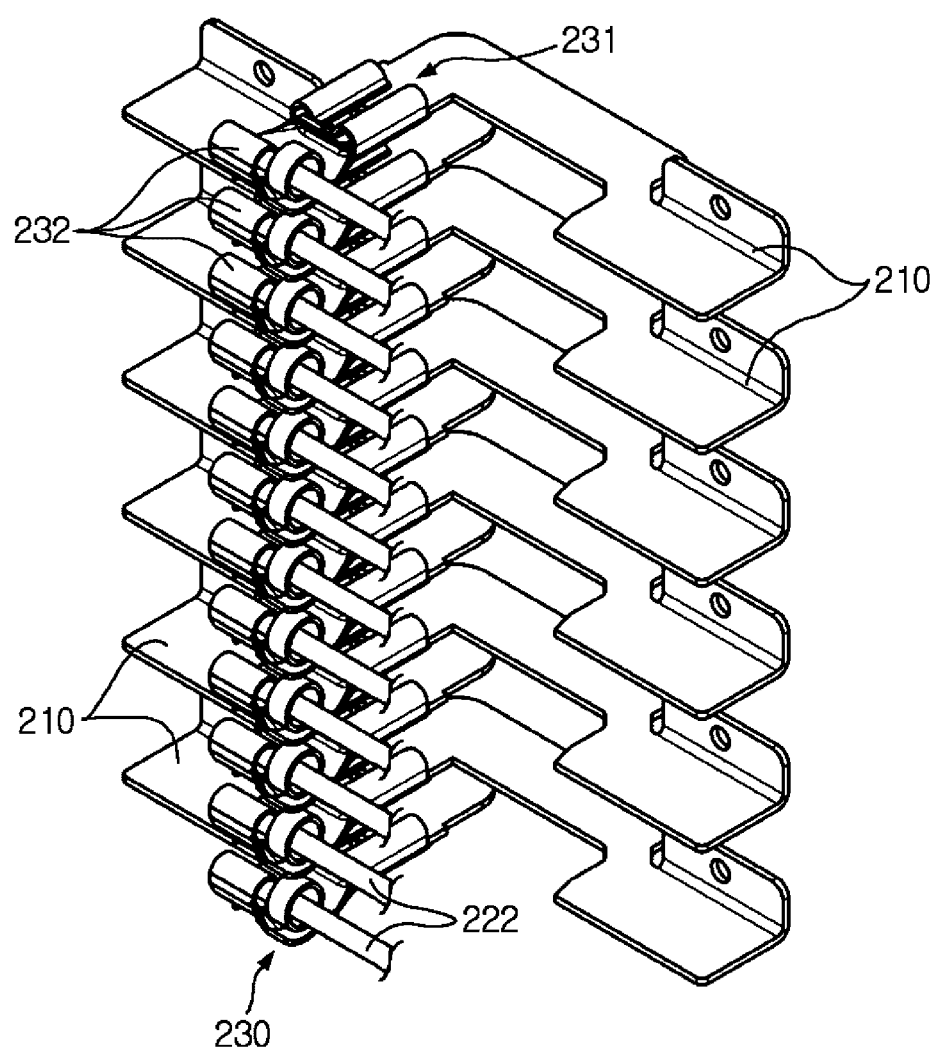
FIG. 4 is an enlarged view showing a sensing plate, employed at the configuration of FIG. 3.
Figure 5:
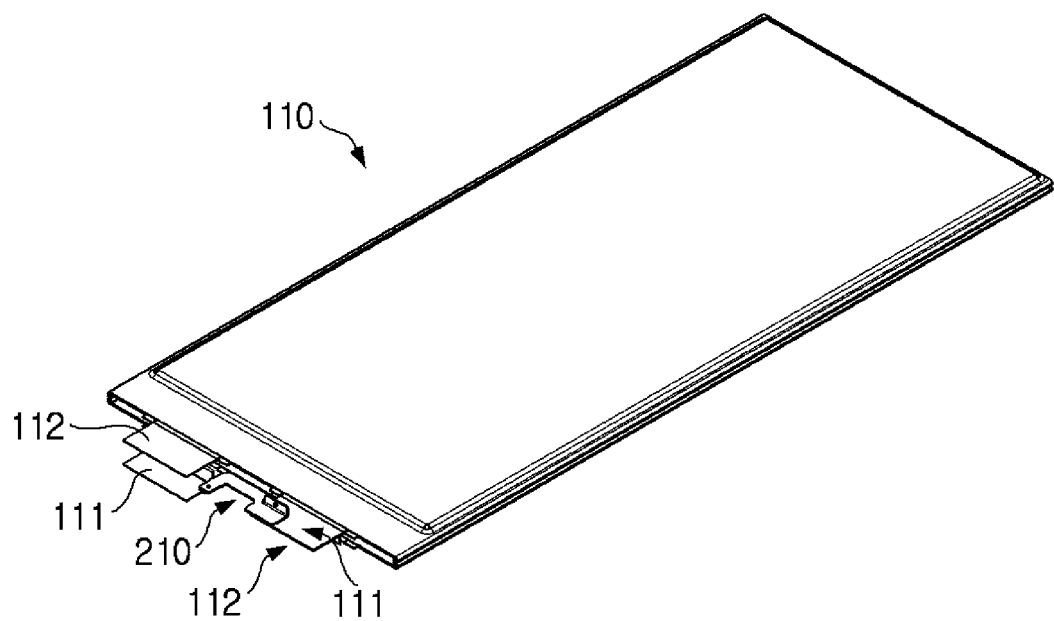
FIG. 5 is a schematic view showing that one of the sensing plates included in the configuration of FIG. 4 is coupled to an electrode lead.
Figure 6:
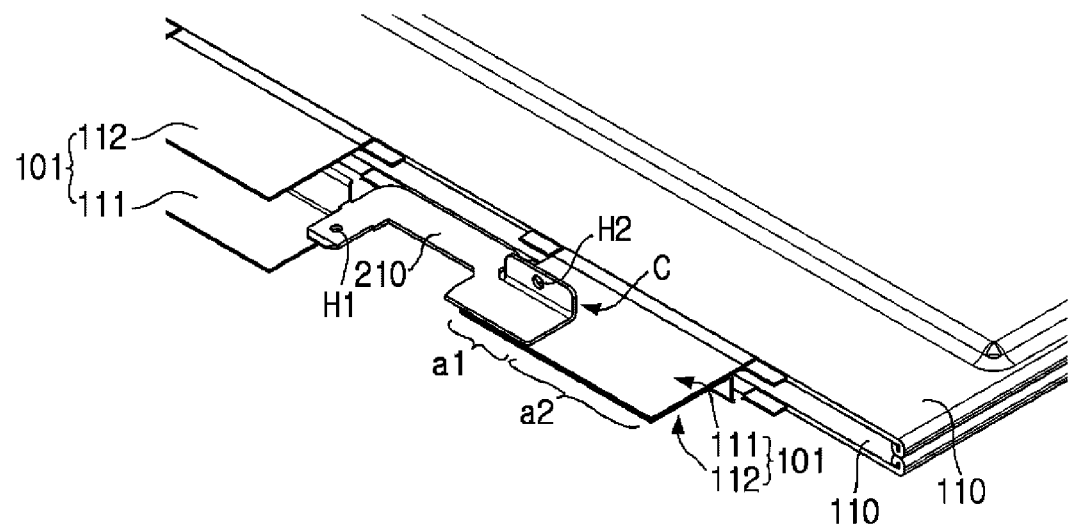
FIG. 6 is an enlarged view showing a coupling portion between the sensing plate and the electrode lead, in the configuration of FIG. 5.

FIG. 3 is a schematic diagram separately showing a sensing plate 210 and a connector 220, employed at the sensing assembly 200, in the configuration of FIG. 2; FIG. 4 is an enlarged view showing the sensing plate 210, employed at the configuration of FIG. 3; FIG. 5 is a schematic view showing that one of the sensing plates 210 included in the configuration of FIG. 4 is coupled to an electrode lead; and FIG. 6 is an enlarged view showing a coupling portion between the sensing plate 210 and the electrode lead, in the configuration of FIG. 5.

Referring to FIGS. 3 to 6, the sensing plate 210 is formed with a plate shape and directly contacts an electrode lead 101 of a secondary battery 110. In particular, referring to FIGS. 5 and 6, the electrode lead 101 may protrude from each secondary battery 110 in a horizontally laid plate shape, and the sensing plate 210 may also be formed with a horizontally laid plate shape, namely with a horizontally flat plate shape, similar to the electrode lead 101, so as to come into face-to-face contact with the electrode lead 101. In addition, the sensing plate 210 may welded in face-to-face contact with the electrode lead 101 and overlapped with the electrode lead 101 so as to be coupled and fixed to the electrode lead 101.

The sensing plate 210 is a component for directly sensing a voltage of the secondary battery 110 in direct contact with the electrode lead 101 of the secondary battery 110, and thus may be made of an electrical conductive material, for example metal material such as aluminum and copper.

Preferably, the sensing plate 210 may be welded to the electrode lead 101 by means of ultrasonic welding. In the sensing assembly 200 according to the present disclosure, the sensing plate 210 may have a horizontally flat configuration so as to be vertically overlapped with the electrode lead 101 which has a horizontally flat configuration. At this time, since the plurality of secondary batteries 110 are vertically stacked in the cell assembly 100, the coupled structure of the sensing plate 210 and the electrode lead 101 as shown in FIGS. 5 and 6 may be provided in plural. Therefore, when the sensing plate 210 and the electrode lead 101 according to the present disclosure are welded, a welding machine may move close to the electrode lead 101 horizontally and perform ultrasonic welding so that the electrode lead 101 and the sensing plate 210 are vertically stacked and welded.

Also preferably, the sensing plate 210 may be welded to two electrode leads 101. At this time, two electrode leads 101 may include an electrode lead 101 of a secondary battery 110 stacked at an upper side and an electrode lead 101 of a secondary battery 110 stacked at a lower side. Here, if two secondary batteries 110 stacked up and down are connected in series, the sensing plate 210 may be welded to a positive electrode lead 111 and a negative electrode lead 112 of different secondary batteries 110 stacked up and down. For example, as shown in FIGS. 5 and 6, a positive electrode lead 111 of a secondary battery 110 stacked at an upper side and a negative electrode lead 112 of a secondary battery 110 stacked at a lower side may come into contact with a lower portion of the sensing plate 210 in an overlapped state, and ultrasonic welding may be performed to the contact portion so that the sensing plate 210, the positive electrode lead 111 and the negative electrode lead 112 are welded and fixed to each other.

In this embodiment of the present disclosure, a process of connecting the sensing plate 210 and the electrode lead 101 and a process of connecting the electrode leads 101 may be performed simultaneously. When the battery module includes a plurality of secondary batteries 110, electrode leads 101 of two or more secondary batteries 110 should be connected to enhance capacity or output. For example, in order to connect two secondary batteries 110 in series as shown in FIGS. 5 and 6, the electrode lead 101 of the secondary battery 110 located at an upper side and the electrode lead 101 of the secondary battery 110 located at a lower side should be connected with different polarities. In addition, in order to stably maintain the connection of the electrode leads 101, the electrode leads 101 may be fixed to each other in contact by means of welding. However, in this embodiment of the present disclosure, since two electrode leads 101 and the sensing plate 210 are welded to each other in an overlapped state, a process of connecting the sensing plate 210 and the electrode lead 101 for sensing voltages of the secondary batteries 110 and a process of connecting two electrode leads 101 for connecting the secondary batteries 110 in series or in parallel may be performed simultaneously. Therefore, even though a process of connecting the sensing plate 210 and the electrode lead 101 and a process of connecting the electrode lead 101 and the electrode lead 101 have been performed separately in an existing art, in the present disclosure, such process complexity may be solved, and the connection structure may also be simplified.

More preferably, the sensing plate 210 may be welded in contact with a portion of surfaces of two electrode leads 101. In other words, when two or more electrode leads 101 and the sensing plate 210 are welded to each other, the sensing plate 210 may be welded to come into contact with a portion of the electrode leads 101 in one side direction of the secondary battery 110, without contacting the entirety of the electrode leads 101.

For example, as shown in FIG. 6, the electrode leads 101 respectively provided at two secondary batteries 110 vertically stacked are overlapped with each other in a vertical direction, and the sensing plate 210 may come into contact with only a first portion a1 of the surface of the overlapped electrode leads 101 without contacting a second portion a2. At this time, welding, particularly ultrasonic welding, may be performed to both the first portion a1 and the second portion a2. In this case, at the first portion a1, welding may be performed among the sensing plate 210, the electrode lead 101 and the electrode lead 101, and at the second portion a2, welding may be performed between the electrode lead 101 and the electrode lead 101.

In this embodiment of the present disclosure, the electrode leads 101 may be fixed to each other more securely. In other words, in the configuration of FIG. 6, at the first portion a1, two electrode leads 101 and one sensing plate 210 are welded, and thus the fixing force between two electrode leads 101 may be somewhat weakened in comparison to the case where only two electrode leads 101 are welded. However, at the second portion a2, only two electrode leads 101 are welded without the sensing plate 210, and thus the fixing force between the electrode leads 101 may be sufficiently ensured by means of the second portion a2. At this time, in order to ensure the fixing force between the electrode leads 101 more sufficiently, the first portion a1 may be smaller than the second portion a2.

The connector 220 transmits voltage information sensed by the sensing plate 210 to another component out of the cell assembly 100. For example, the connector 220 may transmit the sensed voltage information to a protection device such as a Battery Management System (BMS) provided at a battery pack. For this, one end of the connector 220 is electrically connected to the other end of the sensing plate 210. Here, the other end of the sensing plate 210 may mean an end of the sensing plate 210 (i.e., a second end) which is opposite to its end coming into contact with the electrode lead 101 (i.e., a first end). In addition, the connector 220 may include a connection terminal 221 at the other end thereof for the connection with another external component. At this time, a component such as BMS which receives voltage information through the connector 220 may have an input terminal for the coupling with the connection terminal 221 of the connector 220.

Preferably, the connector 220 may be connected to the other end of the sensing plate 210 by means of a wire 222. For example, the connector 220 may connect one end of the wire 222 to the other end of the sensing plate 210, and the wire 222 may extend to the connection terminal 221. Here, the connector 220 may include a plurality of wires 222 for connecting a plurality of sensing plates 210, respectively.

More preferably, the sensing assembly 200 may further include a connection member 230, and the connection member 230 may include a plurality of plate coupling units 231 and a plurality of wire connectors 232.

For example, referring to FIG. 4, the sensing assembly 200 includes a plurality of sensing plates 210 and a plurality of wires 222, and the sensing assembly 200 may further include connection members 230 between the sensing plate 210 and the wires 222. At this time, the connection member 230 may give an electric connection between the sensing plate 210 and the wire 222. For this, the connection member 230 may include a plurality of plate coupling units 231 and a plurality of wire connectors 232. In this case, the other end of the sensing plate 210 is fixed to each plate coupling unit 231, and the wires 222 of the connector 220 may be respectively connected and fixed to the wire connectors 232.

In particular, as shown in FIGS. 3 and 4, the plurality of sensing plates 210 may be arranged with intervals in a vertical direction so as to be welded to the electrode leads 101 of the secondary batteries 110 vertically stacked, and thus a plurality of plate coupling units 231 of the connection member 230 may also be arranged with intervals in a vertical direction. In addition, the plate coupling unit 231 may be coupled and fixed to the sensing plate 210 so that the spaced configuration of the sensing plates 210 may be stably maintained.

At this time, as shown in FIG. 4, both ends of the plate coupling unit 231 may be bent by at least 180 degrees, so that the other end of the sensing plate 210 may be fixed in a state of being inserted into the bent portion. For example, the plate coupling unit 231 may have wings at both ends of a placing portion where the other end of the sensing plate 210 is placed, and after the other end of the sensing plate 210 is placed on the placing portion, the wings at both ends may be bent over 180 degrees to press the upper portion of the sensing plate 210, so that the other end of the sensing plate 210 is coupled to the plate coupling unit 231.

Also preferably, the sensing assembly 200 may be configured so that some of the plurality of sensing plates 210 are provided to protrude in a left direction on the basis of the connection member 230, and the other sensing plates 210 are provided to protrude in a right direction on the basis of the connection members 230.

For example, as shown in FIG. 4, the sensing assembly 200 may be configured so that twelve sensing plates 210 are coupled and fixed to a single connection member 230, and here, six sensing plates 210 may protrude in a left direction on the basis of the connection member 230, and the other six sensing plates 210 may protrude in a right direction on the basis of the connection member 230.

The sensing assembly 200 according to the present disclosure may be advantageously applied to detect a voltage of a unidirectional secondary battery 110 which includes a positive electrode lead 111 and a negative electrode lead 112 at one side. For example, as shown in FIG. 5, the pouch-type secondary battery 110 may be formed as a unidirectional secondary battery 110 at which the positive electrode lead 111 and the negative electrode lead 112 protrude at one side. At this time, the sensing plates 210 of the sensing assembly 200 are respectively provided at right and left sides on the basis of the connection member 230, so as to be connected to both the positive electrode lead 111 and the negative electrode lead 112 of the unidirectional secondary battery 110.

Figure 7:
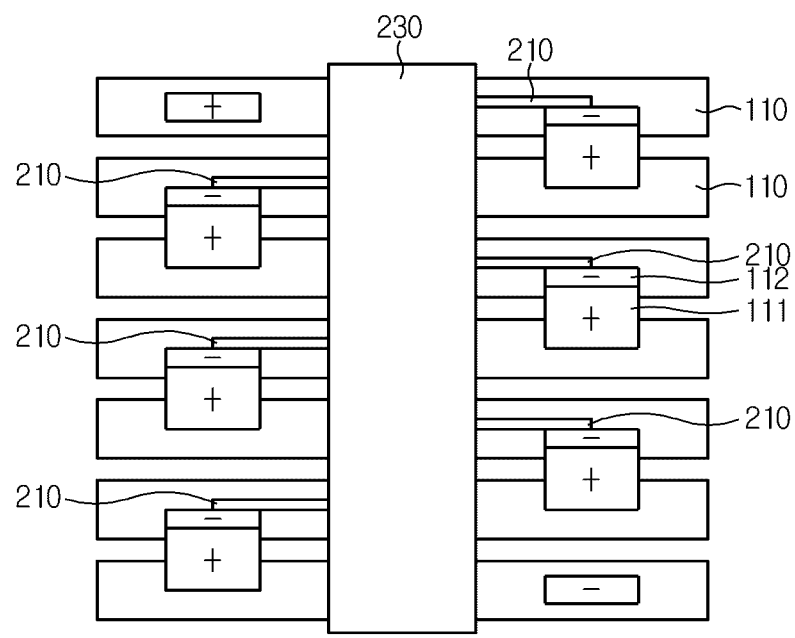
FIG. 7 is a schematic view showing a connecting configuration between a sensing assembly according to an embodiment of the present disclosure and a cell assembly configured with unidirectional secondary batteries.

FIG. 7 is a schematic view showing a connecting configuration between a sensing assembly 200 according to an embodiment of the present disclosure and a cell assembly 100 configured with unidirectional secondary batteries 110. In particular, the configuration of FIG. 7 corresponds to a case where the sensing assembly 200 depicted in FIG. 4 is connected to the electrode leads 101, and may be regarded as showing a connection configuration of the electrode leads 101 to three sensing plates 210, respectively at left and right sides.

Referring to FIG. 7, seven unidirectional secondary batteries 110 are stacked vertically, and electrode leads 101 with opposite polarities may be connected to secondary batteries 110 at adjacent layers for serial connection. In addition, the sensing assembly 200 may be located at a center portion of a side of the unidirectional secondary battery 110 where the electrode leads 101 are located. In particular, the connection member 230 of the sensing assembly 200 may be located between the positive electrode lead 111 and the negative electrode lead 112 of each secondary battery 110, and the sensing plates 210 may be provided to protrude in right and left directions from the connection member 230, respectively.

In FIG. 7, three sensing plates 210 are provided to protrude in a left direction of the connection member 230, and the other three sensing plates 210 are provided to protrude in a right direction of the connection member 230, so that the sensing plates 210 are respectively connected to a connection portion of different electrode leads 101. Therefore, in this embodiment of the present disclosure, a voltage of each secondary battery 110 may be easily detected just with a single sensing assembly 200, with respect to the cell assembly 100 composed of unidirectional secondary batteries 110.

Also preferably, the sensing assembly 200 may further include an electrode terminal and a bus bar. This configuration will be described in more detail with reference to FIG. 8.

Figure 8:
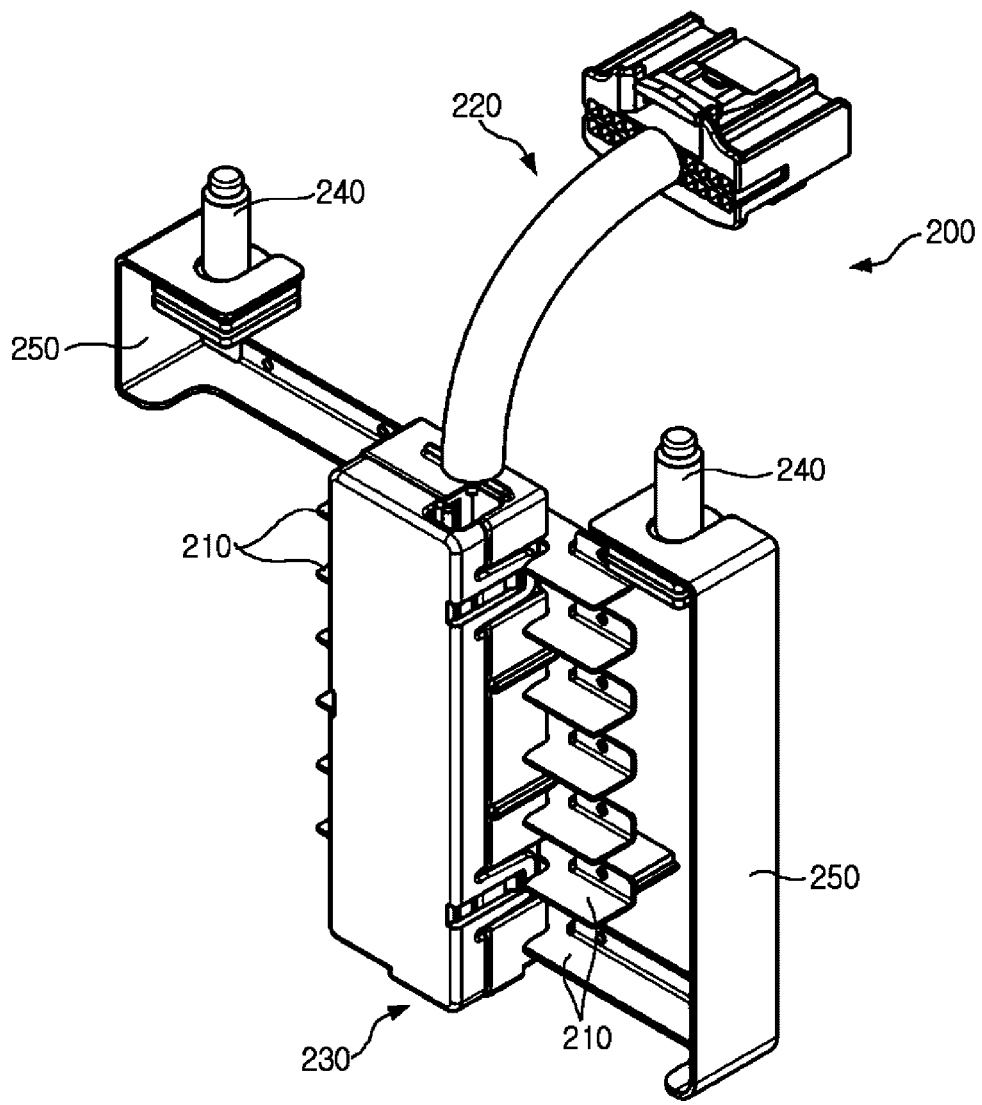
FIG. 8 is a schematic view showing a sensing assembly according to an embodiment of the present disclosure.

FIG. 8 is a schematic view showing a sensing assembly 200 according to an embodiment of the present disclosure. In particular, the configuration of FIG. 8 may correspond to a case where an electrode terminal 240 and a bus bar 250 are added to the configuration of FIG. 3.

Referring to FIG. 8, the sensing assembly 200 may further include the electrode terminal 240 and the bus bar 250, in addition to the sensing plate 210, the connection member 230 and the connector 220.

The electrode terminal 240 may be provided to protrude upwards on the sensing assembly 200, and may serve as a connection terminal for connecting the cell assembly 100 to an external device. For example, a discharge device such as a motor may be connected to the electrode terminal 240 to receive a discharge power from the cell assembly 100. In addition, a charge device such as a commercial power source may be connected to the electrode terminal 240 to supply a charge power to the cell assembly 100. For this, the electrode terminal 240 may include two terminals, namely a positive electrode terminal and a negative electrode terminal.

In addition, the bus bar 250 may be configured to connect the electrode terminal 240 to the sensing plate 210. In addition, the bus bar 250 electrically connects the electrode terminal 240 to a sensing plate 210 located at an uppermost or lowermost portion. For example, in the configuration of FIG. 8, a plurality of sensing plates 210 may be provided respectively at right and left sides on the basis of the connection member 230, and here, a positive electrode bus bar may connect a sensing plate 210 located at a left upper end to the positive electrode terminal, and a negative electrode bus bar may connect a sensing plate 210 located at a right lower end to the negative electrode terminal.

In this embodiment of the present disclosure, since the electrode terminal 240 and the bus bar 250 for electrically connecting the cell assembly 100 to the outside are provided in the sensing assembly 200, just by connecting and assembling the sensing assembly 200 to the cell assembly 100, the electrode terminals 240 may be provided at the battery module. Therefore, it is not needed to provide the cell assembly 100 with a separate electrode terminal 240 such as a terminal bolt and a separate bus bar for connecting the electrode terminal 240 to the cell assembly 100, and thus the battery module, particularly the cell assembly 100, may have a simplified structure and be manufactured more simply.

Meanwhile, as indicated by H1 in FIG. 6, the sensing plate 210 may have a coupling hole at the other end portion thereof which does not come into contact with the electrode lead 101. In addition, a protrusion may be formed at the plate coupling unit 231 of the connection member 230 so as to be inserted into and coupled to the coupling hole H1. Therefore, in this case, the protrusion formed at the plate coupling unit 231 of the connection member 230 may be inserted into and coupled to the coupling hole of the sensing plate 210, and due to this inserted coupling, the coupling between the connection member 230 and the sensing plate 210 may be maintained more securely.

Also preferably, the sensing assembly 200 may further include a support plate. This will be described in more detail with reference to FIGS. 9 and 10.

Figure 9:
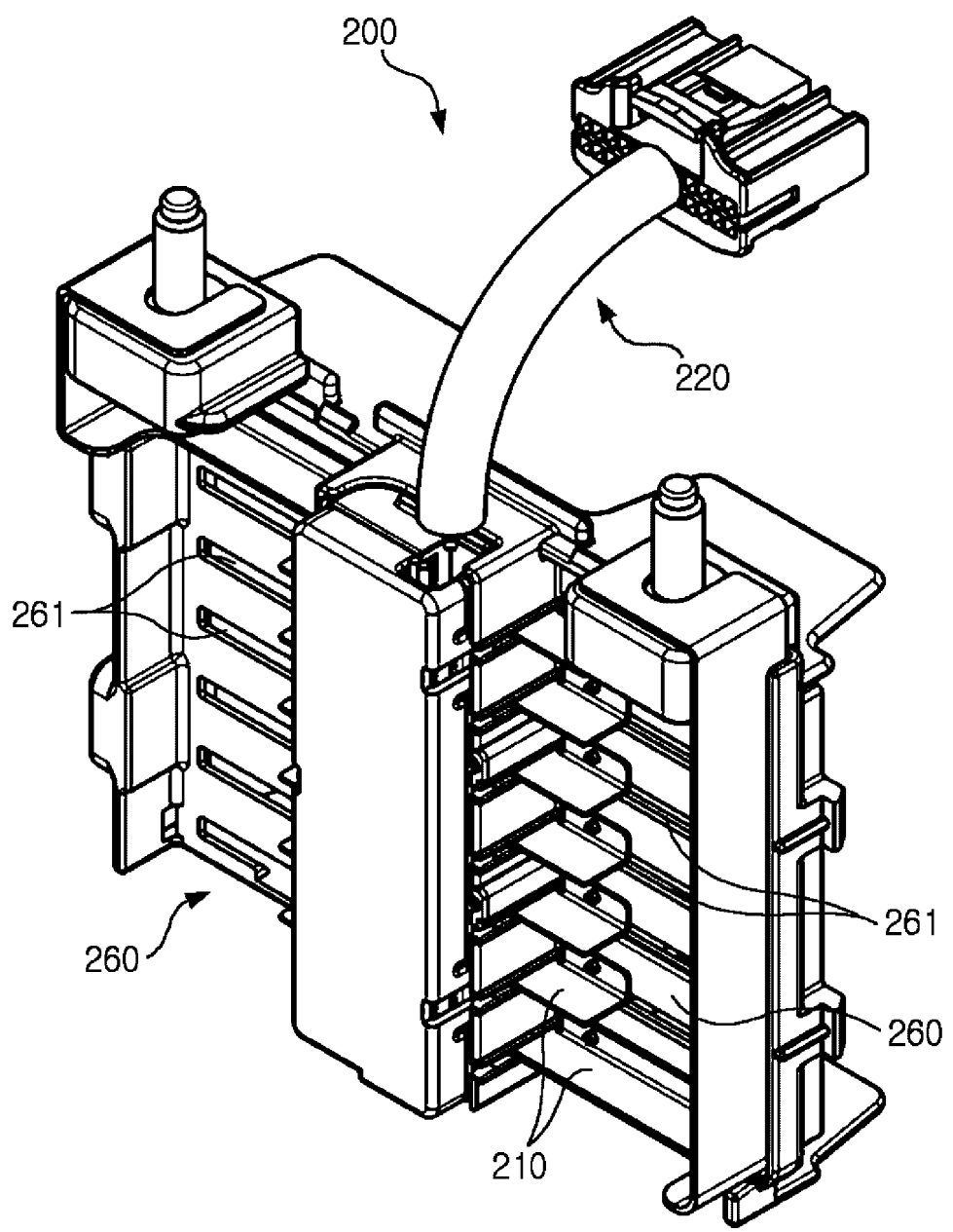
FIG. 9 is a schematic view showing a sensing assembly according to an embodiment of the present disclosure.

FIG. 9 is a schematic view showing a sensing assembly 200 according to an embodiment of the present disclosure. In particular, the configuration of FIG. 9 corresponds to a case where a support plate 260 is added to the configuration of FIG. 8. In addition, FIG. 10 is an enlarged view schematically showing a part of the sensing assembly 200 of FIG. 9.

Figure 10:
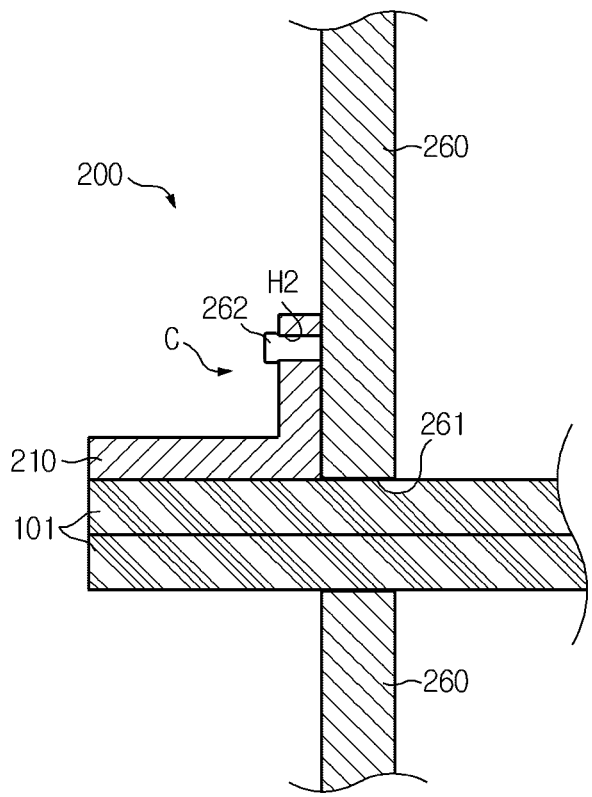
FIG. 10 is an enlarged view schematically showing a part of the sensing assembly of FIG. 9.

Referring to FIGS. 9 and 10, the support plate 260 is formed to have a vertically erect plate shape and may be provided between the sensing plate 210 and the cell assembly 100. In particular, the support plate 260 may have a through hole 261, and the electrode lead 101 may be supported through the through hole 261. In other words, the electrode lead 101 of the cell assembly 100 may be fixed in contact with the sensing plate 210 of the sensing assembly 200 through the through hole 261 of the support plate 260, and due to the through hole 261, the electrode lead 101 may be vertically supported and thus be restricted in its vertical movement. Therefore, the electrode lead 101 and the sensing plate 210, fixed by welding, may be not separated but stably maintain their fixed state. In particular, a battery module used for a vehicle or the like may be exposed to strong vibrations or impacts, and thus if the electrode lead 101 is supported through the through hole 261 of the support plate 260 as in this embodiment, it is possible to prevent the electrode lead 101 from being easily separated from the sensing plate 210 due to such vibrations or impacts. Moreover, since an interval between the electrode leads 101 is not decreased due to the vertical supporting force of the electrode leads 101 by the through hole 261, it is possible to prevent any problem such as an internal short circuit from occurring due to a contact between the electrode leads 101.

Also preferably, the sensing plate 210 may include a bent portion formed by bending a portion thereof in a vertical direction, and the bent portion may be coupled and fixed to the support plate 260. For example, referring to FIGS. 6 and 10, the sensing plate 210 has a horizontally flat configuration to make a face-to-face contact with the electrode lead 101, and as indicated by C, the vertically bent portion is provided at a portion of the sensing plate 210 so that the bent portion is coupled and fixed to the support plate 260.

In this embodiment of the present disclosure, since the sensing plate 210 is coupled and fixed to the support plate 260 by means of the bent portion, the sensing plate 210 and the electrode lead 101 may be welded more easily. Moreover, in this embodiment of the present disclosure, it is possible to prevent the sensing plate 210 and the electrode lead 101 from shaking, and thus the coupled state of the sensing plate 210 and the electrode lead 101 may not be easily released due to vibrations or impacts.

Here, as indicated by H2, an engagement hole may be formed in the bent portion of the sensing plate 210. In addition, a protrusion 262 may be formed at the support plate 260 so as to be inserted into and coupled to the engagement hole of the sensing plate 210. Therefore, in a state where the protrusion of the support plate 260 is inserted into the engagement hole, the coupled state between the sensing plate 210 and the support plate 260 may be stably maintained.

However, the coupling configuration between the sensing plate 210 and the support plate 260 according the present disclosure is not limited to the above, but the sensing plate 210 may be coupled and fixed to the support plate 260 in various ways. For example, engagement holes may be formed in both the sensing plate 210 and the support plate 260, and a bolt may be inserted into the engagement holes to couple and fix the sensing plate 210 and the support plate 260 to each other.

Meanwhile, the battery module according to the present disclosure may further include a sensing cover 300, as shown in FIGS. 1 and 2.

The sensing cover 300 may be provided at an outer side of the sensing assembly 200 to cover the sensing assembly 200. Therefore, when being observed from a side opposite to the cell assembly 100 on the basis of the sensing assembly 200, the sensing cover 300 may allow various components of the sensing assembly 200 not to be exposed outwards, except for the electrode lead 101. In this embodiment of the present disclosure, the sensing cover 300 may eliminate or reduce an influence applied to the sensing assembly 200 from external impacts or substances.

A battery pack according to the present disclosure includes at least one battery module as described above. At this time, in addition to the battery module, the battery pack may further include a case for accommodating the battery module, and various devices for controlling charge/discharge of the battery module such as a Battery Management System (BMS), a current sensor, a fuse or the like. In particular, in the battery pack according to an embodiment of the present disclosure, the connector 220 provided at the sensing assembly 200 of the battery module may be connected to the BMS.

The battery module according to the present disclosure may be applied to a vehicle such as an electric vehicle and a hybrid electric vehicle. In other words, a vehicle according to the present disclosure may include the battery module according to the present disclosure.

Hereinafter, a method for manufacturing a battery module according to the present disclosure will be described briefly.

Figure 11:
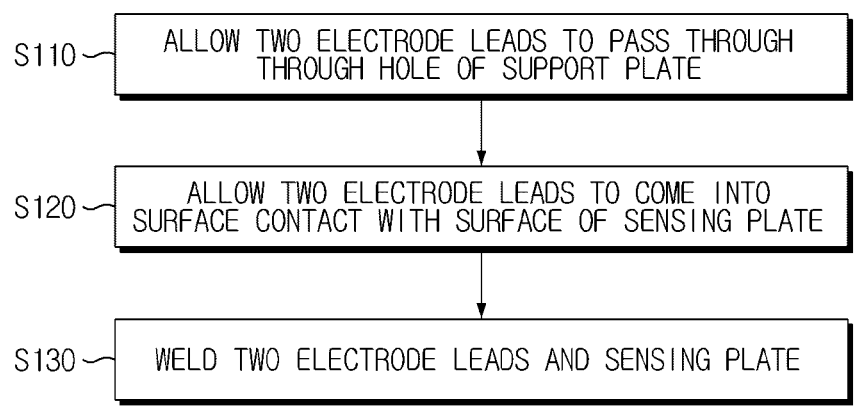
FIG. 11 is a flowchart for illustrating a method for manufacturing a battery module according to an embodiment of the present disclosure.

FIG. 11 is a flowchart for illustrating a method for manufacturing a battery module according to an embodiment of the present disclosure.

Referring to FIG. 11, the method for manufacturing a battery module according to the present disclosure includes the steps of allowing two or more electrode leads 101 to come into surface contact with an upper or lower surface of the sensing plate 210 (S120), and welding the surface-contact portion of the two electrode leads 101 and the sensing plate 210 (S130).

Here, in S120, the two electrode leads 101 may be overlapped in a vertical direction, and only a portion of the surface of the overlapped two electrode leads 101 may come into contact with the sensing plate 210, as shown in FIG. 6.

In this case, in S130, not only a portion where the two electrode lead 101 and the single sensing plate 210 are overlapped but also a portion where the sensing plate 210 is not overlapped but only the two electrode leads 101 are overlapped may be welded.

Preferably, Step S130 may be performed by means of ultrasonic welding.

Meanwhile, as shown in FIGS. 9 and 10, when a support plate 260 having a through hole is provided at the sensing assembly 200, the method for manufacturing a battery module according to the present disclosure may further include the step of allowing two electrode leads 101 to pass through the through hole of the support plate 260 together (S110), as shown in FIG. 11, before Step S120.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or a shape in which an object is placed.

What is claimed is:

1. A sensing assembly, which is connected to a cell assembly in which a plurality of secondary batteries are stacked in a vertical direction, each secondary battery having an electrode lead protruding in a horizontally laid state, for sensing voltages of the secondary batteries, the electrode lead being plate-shaped, the sensing assembly comprising:
   a plurality of sensing plates made of an electrical conductive material with a horizontally laid plate shape and having a first end welded in face-to-face contact with the electrode lead; and
   a connector electrically connected to a second end of the sensing plates to transmit sensed voltages of the secondary batteries,
   wherein each sensing plate is welded to the two electrode leads of adjacent secondary batteries of the plurality of secondary batteries such that a first portion of each of the two electrode leads are overlapped and welded to the sensing plate and a second portion of each of the two electrode leads are only welded to each other.

2. A battery module, comprising:
   a cell assembly in which a plurality of secondary batteries are stacked in a vertical direction, each secondary battery having an electrode lead protruding in a horizontally laid state, the electrode lead being plate-shaped; and
   a sensing assembly for sensing voltages of the secondary batteries, the sensing assembly including a plurality of sensing plates made of an electrical conductive material with a horizontally laid plate shape and having a first end welded in face-to-face contact with the electrode lead, and a connector electrically connected to a second end of the sensing plates to transmit a sensed voltage for each of the secondary batteries,
   wherein each sensing plate is welded to the two electrode leads of adjacent secondary batteries of the plurality of secondary batteries such that a first portion of each of the two electrode leads are overlapped and welded to the sensing plate and a second portion of each of the two electrode leads are only welded to each other.

3. The battery module according to claim 2, wherein the sensing plate is welded to the electrode lead by means of ultrasonic welding.

4. The battery module according to claim 2, wherein the sensing assembly further includes an electrode terminal formed to protrude outwards, and a bus bar for electrically connecting the electrode terminal to a sensing plate of the plurality of sensing plates that is provided at an uppermost or lowermost portion.

5. The battery module according to claim 2, further comprising:
   a sensing cover configured to cover the sensing assembly at a side opposite to the cell assembly.

6. The battery module according to claim 2, wherein the sensing assembly further includes a support plate with a vertically erect plate shape having a through hole through which the electrode lead is provided and by which the electrode lead is supported.

7. The battery module according to claim 6, wherein the sensing plate has a bent portion formed by bending a portion thereof vertically, and the bent portion is coupled and fixed to the support plate.

8. The battery module according to claim 7, wherein an engagement hole is formed in the bent portion of the sensing plate, and a protrusion is formed at the support plate to be inserted into the engagement hole and coupled thereto.

9. The battery module according to claim 2, wherein the connector is connected to the second end of the sensing plate by means of a wire.

10. The battery module according to claim 9, wherein the sensing assembly further includes a connection member provided between the sensing plate and the wire and having a plurality of plate coupling units to which the second end of the sensing plate is coupled and fixed and a plurality of wire connectors to which one end of the wire is connected, the plate coupling units and the wire connectors being arranged in a vertical direction.

11. The battery module according to claim 10, wherein both ends of the plate coupling unit are bent by at least 180 degrees to form a bent portion, and the second end of the sensing plate is inserted into the bent portion and fixed thereto.

12. The battery module according to claim 10, wherein some of the plurality of sensing plates are provided to protrude in a left direction on the basis of the connection member, and the other sensing plates are provided to protrude in a right direction on the basis of the connection member.

13. A battery pack, comprising the battery module according to claim 2.

14. A vehicle, comprising the battery module according to claim 2.

15. A method for manufacturing a battery module, which includes a cell assembly in which a plurality of secondary batteries are stacked in a vertical direction, each secondary battery having an electrode lead protruding in a horizontally laid state, and a sensing assembly having a sensing plate and a connector, the electrode lead being plate-shaped, the method comprising:
   overlapping two electrode leads among the electrode leads to provide two overlapped electrode leads and allowing the two overlapped electrode leads to come into surface contact with the sensing plate; and
   performing ultrasonic welding to the two overlapped electrode leads and the sensing plate,
   wherein a first portion of each of the two overlapped electrode leads are welded to the sensing plate and a second portion of each of the two overlapped electrode leads are only welded to each other.

* * * * *